United States Patent
Uwabo et al.

[19]

[11] Patent Number: 6,021,028
[45] Date of Patent: Feb. 1, 2000

[54] METHOD OF WRITING SERVO DATA AND MAGNETIC RECORDING MEDIUM ON WHICH THE SERVO DATA IS WRITTEN BY THE METHOD

[75] Inventors: Tsuneo Uwabo; Yoshihiro Okano; Eiichi Yoneyama; Yoshinori Tangi, all of Kanagawa, Japan

[73] Assignee: Mitsumi Electric Co., Ltd., Kanagawa, Japan

[21] Appl. No.: 08/774,146

[22] Filed: Dec. 26, 1996

[30] Foreign Application Priority Data

Dec. 25, 1995 [JP] Japan ..................................... 7-350872

[51] Int. Cl.⁷ .......................... G11B 23/033; G11B 5/596
[52] U.S. Cl. ......................................... 360/133; 360/77.08
[58] Field of Search .............................. 360/97.01, 97.02, 360/97.04, 99.05, 103, 133, 77.05, 77.08, 55

[56] References Cited

U.S. PATENT DOCUMENTS 4,901,180  2/1990  Oishi ....................................... 360/133
5,189,574  2/1993  Iwamura et al. ........................ 360/103
5,708,547  1/1998  Oishi ....................................... 360/133

*Primary Examiner*—George J. Letscher
*Attorney, Agent, or Firm*—Patents & TMS, P.C.; Brian M. Mattson

[57] ABSTRACT

A method of writing servo data onto a high density flexible magnetic disk (7) using a servo writer is disclosed. This method comprises the steps of providing surface rippling prevention means on both sides of the magnetic disk, respectively; rotating the flexible magnetic disk at a rotation speed of 2000 rpm or higher with a spindle motor (3); and writing the servo data onto the flexible magnetic disk with magnetic heads (4). The surface rippling prevention means include soft sheet members (8a, 8b) which are arranged in close proximity to both surfaces of the flexible disk (7) in order to prevent surface rippling of the flexible disk (7) from being caused, thereby improving the accuracy of writing servo data. A magnetic recording medium is provided with the flexible magnetic disk on which the servo data is written by the method, a jacket in which the magnetic disk is rotatably provided and the soft sheets members arranged on the both sides of said magnetic disk, respectively;

4 Claims, 2 Drawing Sheets

METHOD OF WRITING SERVO DATA AND MAGNETIC RECORDING MEDIUM ON WHICH THE SERVO DATA IS WRITTEN BY THE METHOD

BACKGROUND OF THE INVENTION

1. Field of the Invention

The present invention relates to a method of writing servo data onto a magnetic recording medium such as a high density flexible magnetic disk and a high density magnetic recording medium on which the servo data is written by the method.

2. Description of the Prior Art

For a high density recording magnetic disk such as a hard disk, it is required to accurately and reliably carry out positioning (i.e., tracking) of a magnetic head with respect to the tracks of the high density recording magnetic disk. For this purpose, servo data for specifying recording tracks is previously recorded on the recording surface of the magnetic disk, and the positioning control of the magnetic head is carried out by reading out such servo data. In order to write such servo data onto the magnetic disk, a device called a "servo writer" is generally used.

In this connection, in recent years, improvements in recording film compositions and the like have led to higher densities and greater storage capacities for flexible disks, such as floppy disks. This, in the same manner as was described above with reference to hard disks, servo data is also recorded onto these flexible disks to carry out accurate and reliable positioning of the magnetic head with respect to tracks.

In this case, a servo writer is also used to write servo data onto such a flexible disk, in which in order to reduce the time required to write such servo data, the servo data is written under the condition that the flexible disk is being rotated at a high rotation speed (e.g., 2000 rpm or higher).

However, in contrast with hard disks, the flexible disks are thin and soft. As a result, when such a flexible disk is rotated at a high rotation speed, surface rippling (a phenomenon that the flexible disk is waved or fluttered) is likely to arise due to deformation of the disk. When such a surface rippling occurs, a writing error of the servo data is liable to be caused, thus leading to a lowering in production yield. In this regard, it should be noted that since in such a high density recording magnetic disk a writing operation is carried out with the writing head slightly floating above the recording surface of the disk, such surface rippling greatly affects the writing accuracy.

SUMMARY OF THE INVENTION

It is an object of the present invention to provide a method of accurately writing servo data and a magnetic recording medium on which the servo data is accurately written by such a method.

In order to achieve the above object, the present invention is directed to a method of writing servo data related to recording tracks onto a high density recording flexible magnetic disk. The method comprises the steps of providing surface rippling prevention means on both sides of the flexible magnetic disk; rotating the flexible magnetic disk at a high rotation speed; and writing servo data onto the rotated flexible magnetic disk.

According to the present invention, since surface rippling of the magnetic disk can be prevented when writing servo data, it becomes possible to record servo data at a high degree of accuracy. This improves the production yield at the time when the flexible magnetic disks are manufactured.

In particular, in the case where servo data is being written on a flexible magnetic disk which is to be rotated at a rotation speed of 2000 rpm or higher and has a recording capacity of 20 MB or higher per one side, the effect of the present invention is even more striking.

Preferably, the surface rippling prevention means are constructed from soft sheet members.

Further, it is also preferred that the sheet members are arranged so as to cover roughly all of the recording surface of the flexible magnetic disk except for the region where the writing of servo data is carried out.

In this case, it is preferred that the servo data is written on the flexible magnetic disk while the magnetic disk is being rotated at a rotation speed of 2000 rpm or higher.

Further, it is also preferred that the flexible magnetic disk has a recording capacity of 20 MB per one side.

The present invention is also directed to a magnetic recording medium which comprises a high density recording flexible magnetic disk on which servo data related to recording tracks has been recorded and a jacket which houses the magnetic disk in such a manner that the flexible magnetic disk can be rotated therein, in which the servo data is written onto the flexible magnetic disk while the flexible magnetic disk is being rotated at a high rotation speed under the condition that surface rippling prevention means are arranged on both sides of the flexible magnetic disk.

As for the magnetic recording medium, it is preferred that the magnetic recording medium is assembled by inserting the flexible magnetic disk on which the servo data has already been written into the jacket.

Further, it is also preferred that the surface rippling prevention means are provided inside the jacket.

As for the surface rippling prevention meaner it is preferably constructed from sheet members which make it possible to form air gaps between the surfaces of the magnetic disk and the sheet members, respectively, when the magnetic disk is rotated at a high rotation speed.

Further, it is also preferred that the magnetic disk has a recording capacity of 20 MB or higher per one side.

In more details, according to the present invention, the servo data is written using a servo writer, for example. As for the magnetic disk on which the servo data related to recording tracks is to be recorded, a high density recording flexible magnetic disk (hereinbelow, referred to as a "flexible disk") is used. The recording capacity of this flexible disk is preferably 20 MB or higher per one side. In this connection, in such a high recording capacity flexible disk, it is especially important to accurately write the servo data.

Further, when writing the servo data onto the flexible disk, the flexible disk is rotated at a high rotation speed, preferably 2000 rpm or higher. When the flexible disk is rotated at such a high rotation speed, surface rippling is likely to occur due to turbulence in the air flow. Therefore, in such a flexible disk, it is particularly preferred to use the method of writing servo data according to the present invention. Further, by rotating the flexible disk at such a high rotation speed, the time it takes to record servo data can be shortened. Therefore, the method of writing servo data according to the present invention is also suitable for mass production of the flexible disks.

When writing the servo data onto the flexible disk in accordance with the present invention, such operation is carried out under the condition that surface rippling prevention means are arranged on both sides of the flexible disk. Namely, the surface rippling prevention means are arranged on both sides of the flexible disk because arrangement at only one side is not enough. In this way, because the present invention makes it possible to reliably prevent surface rippling from occurring from both sides of the flexible disk, it becomes possible to prevent servo data writing errors due to surface rippling, and this in turn makes it possible to accurately record servo data.

As for the surface rippling prevention means, it is preferably constructed from soft sheet members. In this case, it is also preferred that the sheet members cover roughly all the recording surface of the magnetic disk except for the region where the writing of servo data is carried out.

Further, the magnetic recording medium according to the present invention is constructed from a flexible disk and a jacket which houses the flexible disk in such a manner that the flexible disk can be rotated therein, wherein the servo data has already been recorded on the flexible disk by the servo data writing method described above.

Other objects, structures and advantages of the present invention will be described in more details with reference to the preferred embodiments taken in conjunction with the accompanying drawings.

DETAILED DESCRIPTION OF THE PREFERRED EMBODIMENTS

Now, with reference to the appended drawings, a detailed description of the preferred embodiments of a method of writing servo data and a magnetic recording medium on which the servo data is written by such a method will be given.

Figure 1:
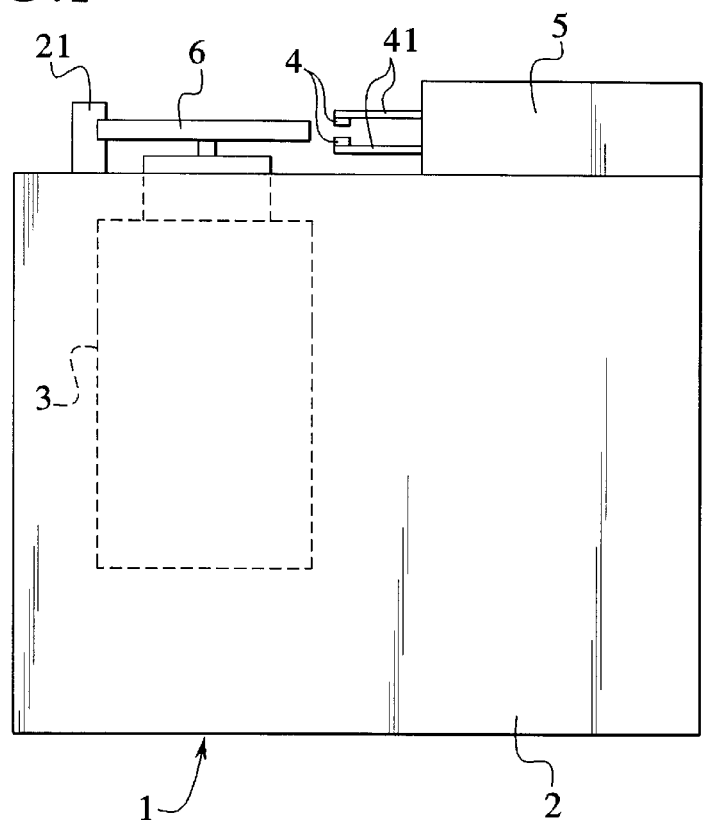
FIG. 1 is a side view of an example of a servo writer used with the method of recording servo data according to the present invention.
Figure 2:
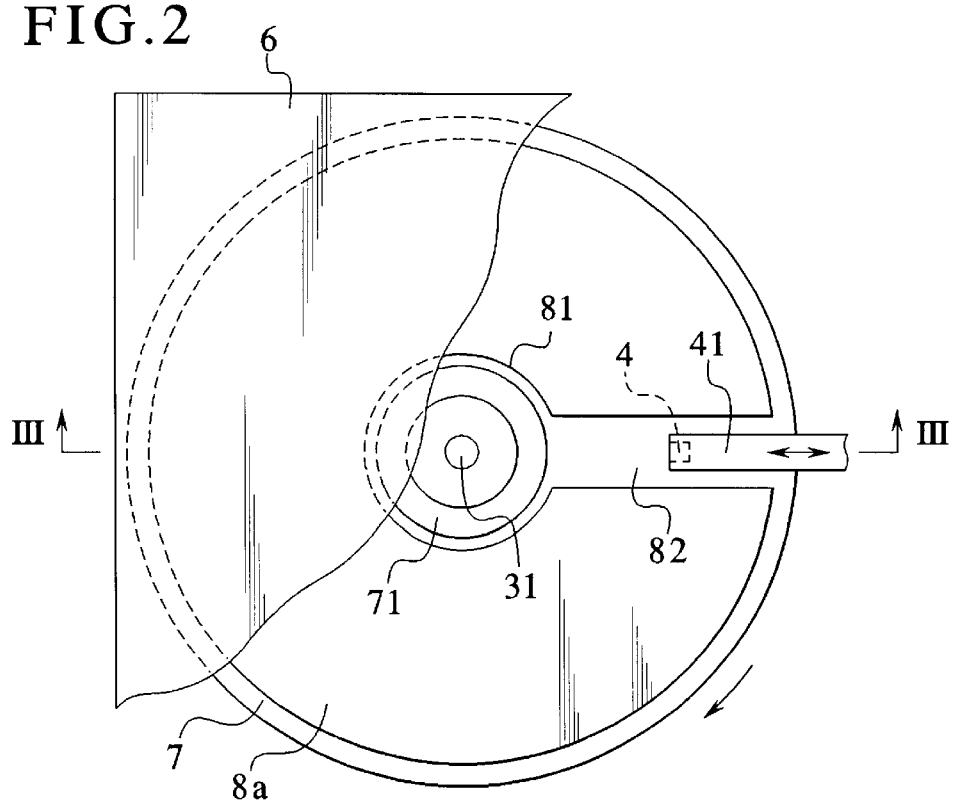
FIG. 2 is a planar view which shows a flexible disk mounted on a flexible disk mounting portion in the servo writer.
Figure 3:
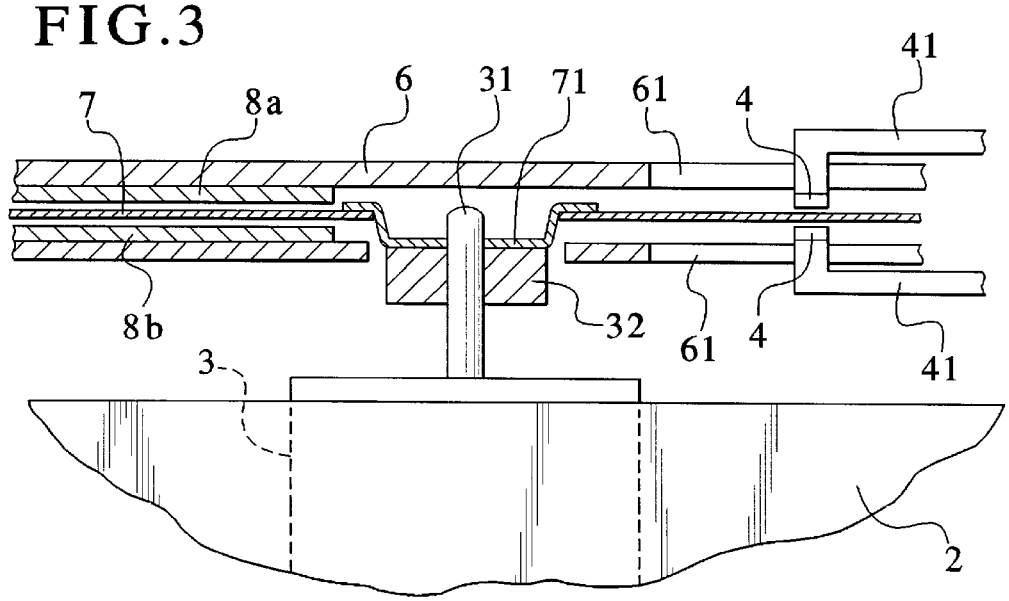
FIG. 3 is a cross-sectional view taken along line A—A in FIG. 2.

In this connection, FIG. 1 is a side view of an example of a servo writer used with the method of writing servo data according to the present invention, FIG. 2 is a planar view which shows a flexible disk mounted on a flexible disk mounting portion in the servo writer, and FIG. 3 is a cross-sectional view taken along line A—A in FIG. 2.

As shown in FIG. 1, a servo writer 1 for writing servo data onto a flexible disk 7 is constructed from a main body 2, a spindle motor 3 provided inside the main body 2, a pair of upper and lower magnetic heads 4 for writing servo data, and a head driving device 5 for moving the heads 4, 4 in the radial direction of the flexible disk 7. Further, the reference numeral 6 in FIG. 1 denotes a holding means for holding surface rippling prevention means. The structure of the holding means 6 is described herein below in more details. The rippling prevention means are positioned at a prescribed distance from the top and bottom surfaces of the flexible disk 7 mounted in the servo writer 1 so as to face such top and bottom surfaces.

The spindle motor 3 is provided to rotate the loaded flexible disk 7 at a prescribed high rotation speed. This rotation speed is preferably above 200 rpm (e.g., 3600 rpm).

As shown in FIG. 3, a disk-shaped disk support 32 which includes a permanent magnet is fixed to a rotation axis 31 of the spindle motor 3. Further, the central portion of the flexible disk 7 is provided with a hub 71 made of stainless steel, for example. In this way, the magnetic force of the permanent magnet in the disk support 32 acts on the hub 71, and this fixes the flexible disk 7 to the rotation axis 31 of the spindle motor 3.

The head driving device 5 includes a carriage (not shown in the drawings) equipped with arms 41, 41 provided with the magnetic heads 4, 4, respectively, and an actuator (not shown in the drawings) for driving the carriage. The head driving device 5 moves the magnetic heads 4, 4 to specific tracking positions on the flexible disk 7 in accordance with prescribed tracking controls.

The holding means 6 is fixedly supported on the main body 2 by a support means 21. In this case, the holding means 6 can be constructed so as to be freely removable with respect to the main body 2. Further, as shown in FIG. 3, in the upper and lower portion of the holding means 6, there are formed openings 61 for allowing the magnetic heads 4, 4 and end portions of the arms 41, 41 to pass therethrough.

In this regard, it is preferred that the holding means 6 is constructed so as to be opened and closed, separated or disassembled when the flexible disk 7 is to be inserted into or removed from the holding means 6. As one example, the holding means 6 can be constructed from two plate-shaped members spaced a prescribed distance from the top and bottom surfaces of the flexible disk 7.

In this way, the flexible disk 7 is freely insertable into and removable out of the space defined between the holding means 6 such as two plate-shaped members or the like. Further, as for the flexible disk 7, it is formed from a high density recording magnetic disk. In particular, it is preferable that such a flexible disk has a recording capacity of 20 MB or higher per one side. In this regard, it should be noted that although the flexible disk 7 of this embodiment is described as a double-sided recordable disk, it is of course possible to utilize a single-sided recordable disk.

Further, provided on the sides of the holding means 6 which face the flexible disk 7 are the surface rippling prevention means as described above. The surface rippling prevention means serve to prevent surface rippling from occurring due to deformation of the flexible disk 7 at the time when servo data is being written onto the flexible disk 7 which is being rotated at a high rotation speed. This surface rippling prevention means are preferably constructed from a pair of soft sheet members (liners) 8a, 8b which respectively face the top and bottom surfaces of the flexible disk 7 at a prescribed distance therefrom.

Now, because both sheet members 8a, 8b have the same construction, the detailed description given below is made with reference to the sheet member 8a which is positioned at the side of the top surface of the flexible disk 7.

Namely, as shown in FIG. 2, the sheet member 8a is formed as a roughly disk-shaped member having an outer diameter that is substantially the same as that of the flexible disk 7. The sheet member 8a includes a circular opening 81 formed in the center portion thereof so as to surround the hub 71 of the flexible disk 7. Further, a cut-out portion 82 is formed in the sheet member 8a at the portion corresponding to the path of motion of the magnetic head 4 so as to allow the magnetic head 4 provided on the end portion of the arm 41 to pass therethrough.

In this way, except for the portion corresponding to the path of motion of the magnetic head 4 (i.e., the portion along which the writing of servo data is carried out), the sheet member 8a is arranged to cover roughly the entire recording surface of the flexible disk 7. As a result, it becomes possible to more reliably prevent the surface rippling from occurring when the flexible disk is being rotated at a high rotation speed.

As for the material used in constructing the sheet members 8a, 8b, it is possible to utilize any material having a relatively low coefficient of friction so long as it does not give any damage to a recording surface of a flexible disk 7 when it touches the recording surface of the flexible disk 7. Examples of suitable materials include paper materials, cloth material and resin materials such as plastic and the like.

Further, while there is no specific limitation on the thickness of the sheet members 8a, 8b, it is normally preferred that the thickness be in the range 0.1 mm–1.0 mm, and it is more preferred that the thickness be in the range 0.2 mm–0.5 mm.

Furthermore, these sheet members 8a, 8b may be fixed by bonding or the like to the sides of the holding means 6 which face the flexible disk 7 or they may be arranged so as to be able to move (i.e. rotate) with respect to the holding means 6.

Although the sheet members 8a, 8b of this embodiment are described as having the same construction, it is of course possible for the sheet members 8a, 8b to be constructed from different materials and/or have different shapes and dimensions.

Hereinbelow, a description of a method of writing servo data using the servo writer 1 will be given.

First, the flexible disk 7 is positioned in the space of holding means 6 and the hub 71 of the flexible disk 7 is fixed to the disk support 32 by the magnetic force of the permanent magnet of the disk support 32, and then the spindle motor 3 is driven to rotate the flexible disk 7 it a prescribed rotation speed (e.g., 3600 rpm).

Next, the head driving device 5 is operated to move the magnetic heads 4, 4 to a position corresponding to a prescribed recording track of the flexible disk 7. Then, at a prescribed time, a voltage corresponding to servo data is supplied to the magnetic heads 4, 4 to cause servo data to be written into the servo data recording region of such recording track.

As for the servo data, it includes information such as synchronizing signals (SYNC) for detecting the servo data recording region, codes (GRAY CODE) for specifying the track number and the like. Thus, by reproducing such servo data, it is possible to specify the recording track of the flexible disk 7.

Next, the head driving device 5 is operated to move the magnetic heads 4, 4 to a position corresponding to the next recording track, and then servo data is written into this recording track in the same manner as described above for the first track. Then and this process is repeated for each successive recording track.

When such servo data is being written in this way, because the sheet members 8a, 8b are arranged at both sides of the flexible disk 7 in close vicinity of the surfaces thereof, a thin air gap (having a thickness of 0.1 mm–0.8 mm) is formed between each of the sheet members 8a, 8b and each the upper and lower surfaces of the flexible disk 7 which is being rotated at a high rotation speed. In this way, it is possible to prevent surface rippling (waving or fluttering) of the flexible disk 7 from occurring and thereby achieve a smooth and reliable rotation thereof. As a result, servo data writing errors can be prevented, and this makes it possible to accurately record servo data onto the flexible magnetic disk 7.

Next, a description will be given for the magnetic recording medium according to the present invention.

Figure 4:
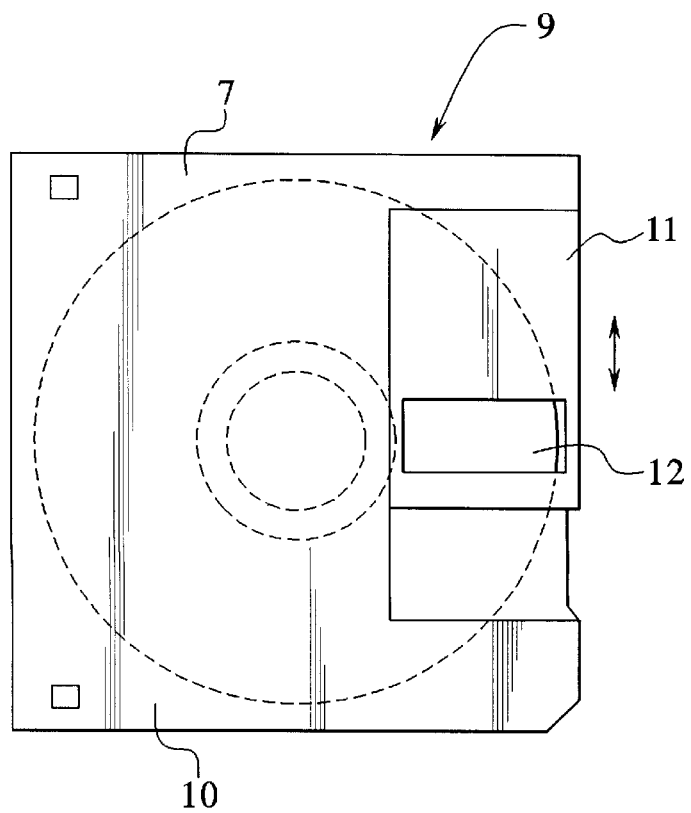
FIG. 4 is a planar view which shows an embodiment in which the magnetic recording medium according to the present invention is constructed as a floppy disk.

FIG. 4 is a planar view showing an embodiment in which the magnetic recording medium according to the present invention is constructed as a floppy disk. As is shown in this drawing, the floppy disk 9 is configured as a 3.5 inch floppy disk 9. The floppy disk 9 is constructed from a flexible disk 7 bearing the servo data which has been recorded in the same manner as described previously above and a jacket or a cartridge 10 which houses the flexible disk 7 therein in such a manner that the flexible disk 7 can be rotated.

Further, the jacket 10 is provided with a shutter 11 which can be opened and closed by sliding in the direction indicated by the arrow in FIG. 4 and includes an opening 12 formed in the shutter 11. FIG. 4 shows a state where the flexible disk 7 is exposed from the opening 12 of the shutter 11; that is the figure shows a state where recording/reproducing operations can be carried out.

In this connection, it is preferred that the floppy disk 9 is assembled by inserting the flexible disk 7 on which the servo data has been already recorded by the method described above into the jacket 10.

Alternatively, it is also possible to write or record servo data onto a flexible disk 7 after the floppy disk 9 has been assembled by inserting the flexible disk 7 into the jacket 10. In this case, writing of the servo data is carried out under the condition that the surface rippling prevention means such as the sheet members 8a, 8b are disposed on the inner upper and lower surfaces of the jacket 10, respectively, so as to sandwich the flexible disk 7. This means that in such a case the upper and lower surfaces of the jacket 10 function in a similar manner to the holding means 6 of the surface rippling prevention means.

As described above, because the present invention makes it possible to prevent surface rippling of the flexible disk from occurring when writing servo data, it becomes possible to record servo data at a high degree of accuracy, and this improves the production yield at the time such flexible disks are manufactured.

In particular, in the case where servo data is being written on a flexible disk while the flexible disk is being rotated at a rotation speed of 2000 rpm or higher and the flexible disk has a recording capacity of 20 MB or higher per side, the effect of the present invention is even m ore striking.

Finally, it is to be noted that even though the present invention was described with reference to the embodiments shown in the appended drawings, the present invention is in no way limited to these structures. The scope of the present invention will be determined by the following claims.

What is claimed is:

1. A method of writing servo data related to record tracks onto a high density flexible recording magnetic disk with a servo writer, the method comprising the steps of:

preparing a flexible magnetic disk having a recording capacity of 20 MB or higher per side;

placing the flexible disk into a jacket which houses the flexible magnetic disk in a rotatable manner wherein soft sheet members for preventing surface rippling are arranged on both sides of the flexible magnetic disk within the jacket such that each of the sheet members covers substantially an entire recording surface of the flexible magnetic disk except for regions where the servo data is to be written by the servo writer wherein the soft sheet members prevent writing errors to thereby accurately record servo data;

mounting the jacket containing the flexible magnetic disk and the soft sheet members on a drive means of the servo writer which rotates the flexible magnetic disk in the jacket, wherein the jacket containing the flexible magnetic disk is removably mounted to the drive means of the servo writer; and writing the servo data onto the flexible magnetic disk while rotating the flexible magnetic disk in the jacket at a rotation speed of 2000 rpm or higher.

2. The method as claimed in claim 1 wherein each of the sheet members is arranged inside the jacket so as to be displaceable with respect to the jacket.

3. The method as claimed in claim 1 wherein an air gap is formed between each surface of the flexible magnetic disk and each of the soft sheet members, respectively, when the flexible magnetic disk is rotated.

4. The method as claimed in claim 1 wherein each of the soft sheet members has a thickness of 0.2 to 0.5 mm.

* * * * *

UNITED STATES PATENT AND TRADEMARK OFFICE
CERTIFICATE OF CORRECTION

PATENT NO. : 6,021,028
DATED : Feb. 1, 2000
INVENTOR(S) : Uwabo et al.

It is certified that error appears in the above-identified patent and that said Letters Patent is hereby corrected as shown below:

Title: Title should read: "Method of writing servo data onto a high density flexible disk having a jacket with soft sheet ripple preventing members for preventing servo data writing errors"

Col. 1, Line 28 "this" should be "thus"
Col. 2, Line 36 "meaner" should be "means"
Col. 3, Line 33 "A-A" should be "III-III"
Col. 3, Line 51 "A-A" should be "III-III"
Col. 5, Line 37 "it" should be "at"
Col. 5, Line 57 insert a coma after "then"
Col. 5, Line 64 "of" was omitted before the word "the"
Col. 6, Line 22 insert coma after "is"

Signed and Sealed this

Fifteenth Day of May, 2001

Attest:

NICHOLAS P. GODICI

Attesting Officer     Acting Director of the United States Patent and Trademark Office